United States Patent
Yoon et al.

(10) Patent No.: US 10,623,549 B2
(45) Date of Patent: Apr. 14, 2020

(54) METHOD OF OUTPUTTING SCREENS FROM SERVER AND CLIENT DEVICES IN PERFORMING MIRRORLINK

(71) Applicant: LG ELECTRONICS INC., Seoul (KR)

(72) Inventors: Chongook Yoon, Seoul (KR); Kwanghee Lee, Seoul (KR); Yuseok Yang, Seoul (KR); Kgiwung Ryoo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/973,602

(22) Filed: May 8, 2018

(65) Prior Publication Data

US 2018/0262605 A1 Sep. 13, 2018

Related U.S. Application Data

(63) Continuation of application No. 14/946,268, filed on Nov. 19, 2015, now Pat. No. 9,992,319.

(60) Provisional application No. 62/113,517, filed on Feb. 8, 2015.

(51) Int. Cl.
*H04M 3/00* (2006.01)
*H04M 1/725* (2006.01)
*H04M 1/60* (2006.01)

(52) U.S. Cl.
CPC ........ *H04M 1/7253* (2013.01); *H04M 1/6083* (2013.01); *H04M 1/6091* (2013.01); *H04M 1/72558* (2013.01)

(58) Field of Classification Search
CPC ............ H04M 1/7253; H04M 1/6083; H04M 1/6091; H04M 1/72558
See application file for complete search history.

(56) References Cited

U.S. PATENT DOCUMENTS

| | | |
|---|---|---|
| 6,427,227 B1 | 7/2002 | Chamberlain |
| 8,117,608 B1 | 2/2012 | Slettehaugh et al. |
| 9,109,917 B2 | 8/2015 | Foster et al. |
| 9,200,915 B2 | 12/2015 | Vulcano et al. |
| 9,594,605 B2 | 3/2017 | Farrugia et al. |
| 2001/0034736 A1 | 10/2001 | Eylon et al. |
| 2002/0109718 A1 | 8/2002 | Mansour et al. |
| 2011/0254863 A1* | 10/2011 | Hoshino ................. G01C 21/36 345/660 |
| 2012/0250517 A1* | 10/2012 | Saarimaki ......... H04M 1/72569 370/241 |

(Continued)

*Primary Examiner* — Stephen M D Agosta
(74) *Attorney, Agent, or Firm* — Birch, Stewart, Kolasch & Birch, LLP

(57) ABSTRACT

A MirrorLink server for communicating with a MirrorLink client, the MirrorLink server including a display unit; a memory configured to store at least one of a certified application; a communication unit configured to establish a connection between the MirrorLink client and the Mirror-Link server; and a controller coupled to the display unit, the memory and the communication unit. The controller is further configured to provide the at least one of a certified application stored in the memory, receive at least one of an interrupt, wherein the at least one of the interrupt corresponds to a home key event or a back key event, and switch either to the MirrorLink client's native UI or another screen in response to the at least one of the interrupt.

6 Claims, 7 Drawing Sheets

(56) References Cited

U.S. PATENT DOCUMENTS

| | | |
|---|---|---|
| 2013/0274997 A1 | 10/2013 | Chien |
| 2013/0297835 A1 | 11/2013 | Cho |
| 2014/0018056 A1 | 1/2014 | Miyake et al. |
| 2014/0120829 A1 | 5/2014 | Bhamidipati et al. |
| 2014/0277937 A1 | 9/2014 | Scholz et al. |
| 2015/0012826 A1 | 1/2015 | Tengstrand et al. |
| 2015/0032800 A1 | 1/2015 | Hrabak |
| 2016/0134996 A1 | 5/2016 | Verma et al. |

\* cited by examiner (a)

(b)

METHOD OF OUTPUTTING SCREENS FROM SERVER AND CLIENT DEVICES IN PERFORMING MIRRORLINK

CROSS REFERENCE TO RELATED APPLICATIONS

This application is a Continuation of co-pending application Ser. No. 14/946,268, filed on Nov. 19, 2015, which claims priority under 35 U.S.C. § 119(e) to U.S. Provisional Application No. 62/113,517, filed on Feb. 8, 2015, all of which are hereby expressly incorporated by reference into the present application.

BACKGROUND OF THE INVENTION

Field of the Invention

The present invention relates to a method of outputting screens from a server device and a client device in performing MirrorLink, and more particularly, to a method of outputting a screen from a server device in performing MirrorLink and a method of outputting a screen from a client device in performing the same. Although the present invention is suitable for a wide scope of applications, it is particularly suitable for outputting a screen excluding elements of a non-certified application when an occurrence of an interrupt for requesting to stop a screen output in the course of performing MirrorLink.

Discussion of the Related Art

Recently, as a mobile terminal such as a smartphone is generalized, the demand for using various applications and services provided through the mobile terminal within a vehicle is increasingly rising. Particularly, in providing a service using an application of a mobile terminal among services of an in-vehicle infotainment system (IVI), a connectivity controller (connectivity ECU) is expected as playing a great role.

In order to meet the consumer's needs and to occupy a rapidly developing market of a connectivity controller, vehicle manufacturers make ongoing efforts to research and develop various connectivity controller technologies, IVI system & smartphone interworking technologies (e.g., MirrorLink, Apple Digital iPod Out, Google Android Auto, etc.). According to the connectivity controller technologies, a connection between an IVI system and a mobile terminal is controlled and an environment for sharing applications and services of the mobile terminal is provided by the determined protocol.

SUMMARY OF THE INVENTION

Accordingly, one object of the present invention is to provide a method of outputting screens from a server device and a client device in performing MirrorLink that substantially obviates one or more problems due to limitations and disadvantages of the related art.

An object of the present invention is to provide an efficient manipulating mechanism in performing an interworking function between a vehicle and a mobile terminal.

Particularly, one object of the present invention is to provide a method of excluding outputs of non-certified application elements in performing MirrorLink.

Technical tasks obtainable from the present invention are non-limited by the above-mentioned technical tasks. In addition, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of outputting a screen of a server device transmitting video information to a client device in performing MirrorLink according to one embodiment of the present invention may include the steps of outputting a first running screen of a prescribed application and if a certified launcher application is usable when an interrupt for requesting to stop outputting the first running screen occurs, outputting a second running screen of the launcher application.

In another aspect of the present invention, as embodied and broadly described herein, a method of outputting a screen of a client device receiving video information from a server device in performing MirrorLink according to another embodiment of the present invention may include the steps of outputting a first running screen of a prescribed application received from the server device and if a certified launcher application is usable when an interrupt for requesting to stop outputting the first running screen occurs, outputting a second running screen of the launcher application.

Effects obtainable from the present invention may be non-limited by the above mentioned effect. In addition, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Figure 1:
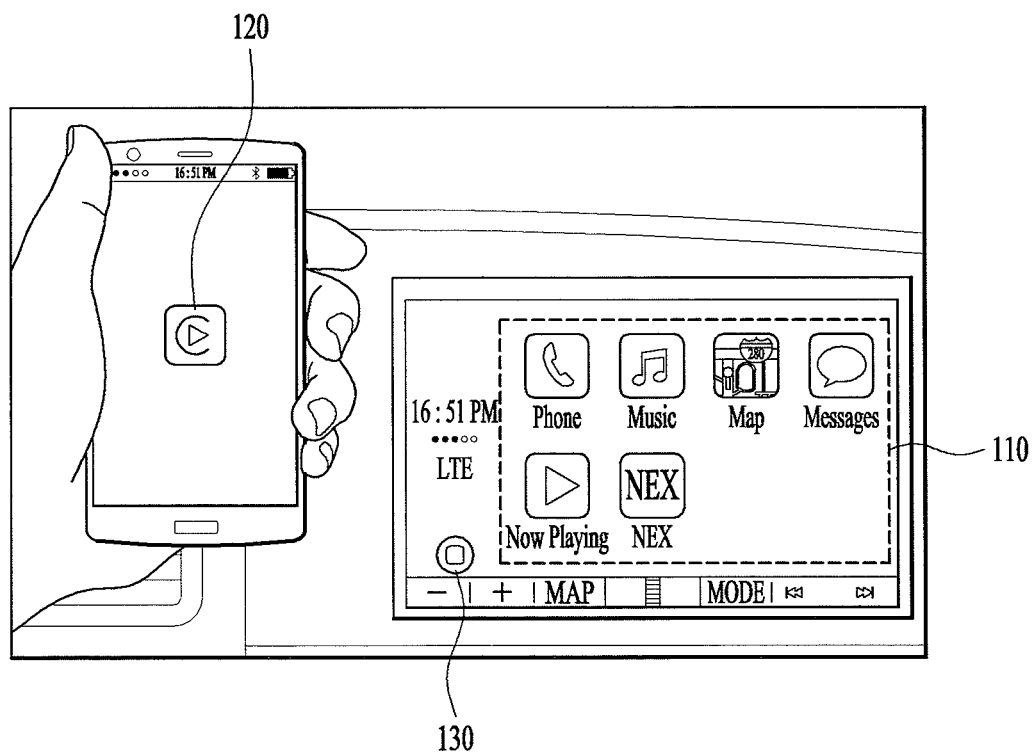
FIG. 1 is a diagram illustrating one example of outputting a certified application list through an IVI system.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A protocol for an interworking between an IVI system and a smartphone, which is mentioned in the present invention, is assumed as following the technology 'MirrorLink' as one of smartphone mirroring technologies provided by Car Connectivity Consortium. Particularly, according to the general technology 'MirrorLink', a client is an IVI system and a server is a smartphone. Of course, such a protocol is exemplarily provided. If a developing tool according to an embodiment of the present invention is a protocol for an interworking function between an IVI system and a smartphone, it is apparent to those skilled in the art that the protocol is applicable to other mobile platforms or connectivity technologies without restrictions.

The IVI system may include a function unit configured to output video (or image) information and audio information received from a mobile terminal. For instance, video information received from a mobile terminal is output through a center fascia display, a head-up display, a rear seat display and the like, while audio information received from the mobile terminal is output through a head unit.

A mobile terminal may include various electronic devices capable of communicating with such IVI systems as a smartphone, a tablet, a laptop, a PDA, an MP3, a PMP and the like. Yet, for clarity of the following description with reference to the accompanying drawings, assume that the mobile terminal includes the smartphone. The object of MirrorLink is to output a screen of a mobile terminal through an IVI system. MirrorLink may be appreciated as inter-device screen replication. As the screen of the mobile terminal is output through the IVI system, applications installed on the mobile terminal, internet services through the mobile terminal and the like can be used through the IVI system.

In order to output the screen of the mobile terminal through the IVI system, such wireless communication schemes as Bluetooth, Wi-Fi (Wireless-Fidelity), Wi-Fi Direct, UWB (Ultra Wideband), Zigbee, NFC (Near Field Communication) and the like or such wire communication schemes as USB, HDMI and the like can be applied between the mobile terminal and the IVI system.

The mobile terminal transmits video (or image) data and audio data to the IVI system using one of the above-listed communication schemes and the IVI system can then output the video and audio data received from the mobile terminal.

In the course of performing MirrorLink, a user can manipulate an application through the mobile terminal or the IVI system. For instance, if a touch input is received through the IVI system, the IVI system can transmit location information of touch coordinates, information on an object selected by the corresponding touch and/or the like to the mobile terminal. Based on the information received from the IVI system, the mobile terminal can launch a prescribed function.

While a vehicle is driven, if a mobile terminal or an IVI system is manipulated, the driver's attention on driving the vehicle is distracted to raise the possibility of danger of traffic accident. Hence, the car connectivity consortium (CCC) of the MirrorLink technology certification consortium certifies an application free from driving distraction only and MirrorLink is limitedly usable for the certified application only.

CCC grants a different certification depending on whether an application should be used only for a stopped car or a currently driven car. For clarity of the following description, an application to which a certification is granted by CCC shall be named a certified application. In particular, among the applications certified by CCC, an application usable only for a stopped car shall be named a base certified application and an application used for a stopped car and a currently driven car both shall be named a drive certified application.

In order to use an application certified by the CCC only, if a connection is established between a mobile terminal and an IVI system, a certified application list can be output through the IVI system. For instance, FIG. 1 is a diagram illustrating one example of outputting a certified application list through an IVI system. If a connection is established between a mobile terminal and an IVI system, the mobile terminal can send a signal requesting the IVI system display a certified application list. In response to the received signal, as shown in FIG. 1, the IVI system can display a certified application list 110.

While the certified application list 110 is displayed through the IVI system, as shown in FIG. 1, a graphic object 120 indicating that a MirrorLink service is currently used can be output through the mobile terminal. Alternatively, the certified application list 110 may be simultaneously output through the mobile terminal and the IVI system.

While a vehicle is stopped, the certified application list including stop certified applications (e.g., base certified applications) are displayed. While the vehicle is driven, the certified application list including drive certified applications are displayed. If a user input for selecting a prescribed item from the certified application is received through the mobile terminal or the IVI system, the mobile terminal can launch an application corresponding to the selected item. Once the application is executed, the mobile terminal can transmit video or image information to the IVI system. Hence, an execution screen of the application can be displayed through the IVI system.

In addition, the certified application list may be called a MirrorLink application list. Considering that the certified application list is one example of a user interface displayed through the IVI system corresponding to a MirrorLink client, the certified application list may be called MirrorLink client's native user interface.

Generally, a smartphone provides manipulating mechanism such as a touchscreen, a home button, a cancel button and the like. In particular, the touchscreen is a mechanism for receiving a touch input and the home button is a mechanism for shifting to a home screen. In this instance, the home screen may include an icon or widget of an application installed on a mobile terminal and the like.

Figure 2:
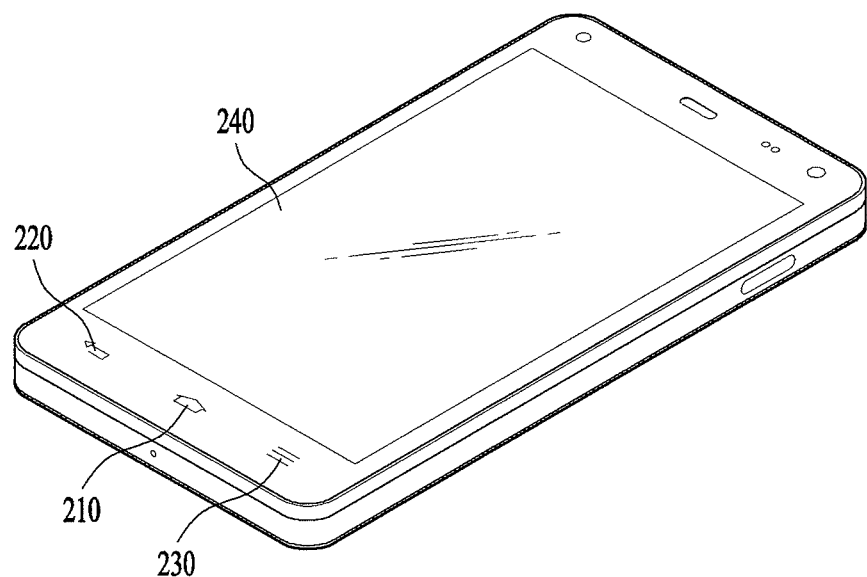
FIG. 2 is a diagram illustrating one example of a manipulating means provided by a smartphone.
Figure 2:
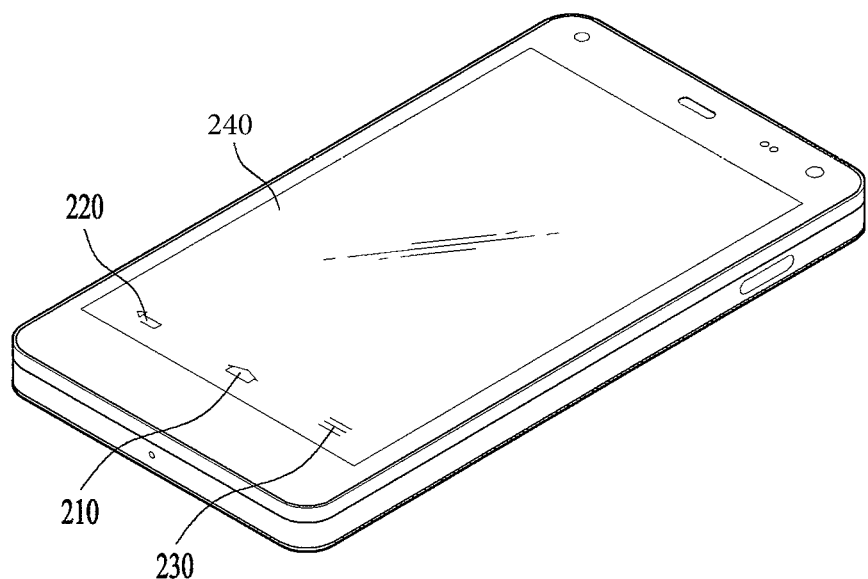

The cancel button is a mechanism for cancelling a most recently executed command. In more detail, FIG. 2 is a diagram illustrating one example of a manipulating mechanism provided by a smartphone. Referring to FIG. 2 (*a*), a menu button 230 is additionally provided together with a home button 210 and a cancel button 220. The menu button 230 can be selected to display a menu.

In this instance, the home button 210, the cancel button 220 and the menu button 230 may be provided as software key buttons on a touchscreen 240. For instance, as shown in FIG. 2 (*a*), the home button 210, the cancel button 220 and the menu button 230 are embodied with physical key buttons. On the contrary, referring to FIG. 2 (*b*), the home button 210, the cancel button 220 and the menu button 230 may be provided as virtual key buttons on the touchscreen.

According to the example shown in FIG. 2 (*a*) and FIG. 2 (*b*), the home button 210, the cancel button 220 and the menu button 230 are also provided as the manipulating mechanism in addition to the touchscreen 240. Yet, the manipulating mechanism provided through the mobile terminal are non-limited by the examples shown in FIG. 2 (*a*) and FIG. 2 (*b*). Configurations and types of the buttons provided through the mobile terminal may be different from those shown in the drawing.

While a MirrorLink service is performed, a home button, a cancel button, a menu button and the like may be output through the IVI system as well. According to the example shown in FIG. 1, a home button 130 is output through the IVI system together with the certified application list.

While an application execution screen is output through an IVI system if a user input of pressing a home button is received, if a home screen is output through the IVI system in response to the received user input, an unexpected problem may be caused. For instance, although an icon of a non-certified application not having a CCC certification granted thereto exists in a home screen, if the home screen is output through the IVI system, it is possible that the non-certified application may be launched while a vehicle is being driving. As the cancel button is manipulated, if the application stops being executed and a home screen is output, it is also possible that the non-certified application may be launched.

In order to prevent a non-certified application from being launched while a vehicle is being driven, if there occurs an interrupt (e.g., a reception of a user input of pressing the home button or the cancel button) for stopping an output of an application running screen in the IVI system, it is necessary to prevent an element (e.g., an icon of the non-certified application, a widget provided by the non-certified application, etc.) related to the non-certified application from being output. A method of preventing an output of an element related to a non-certified application is described in detail with reference to the accompanying drawings as follows.

Embodiment 1—Case of Non-Existence of Launcher Application

Figure 3:
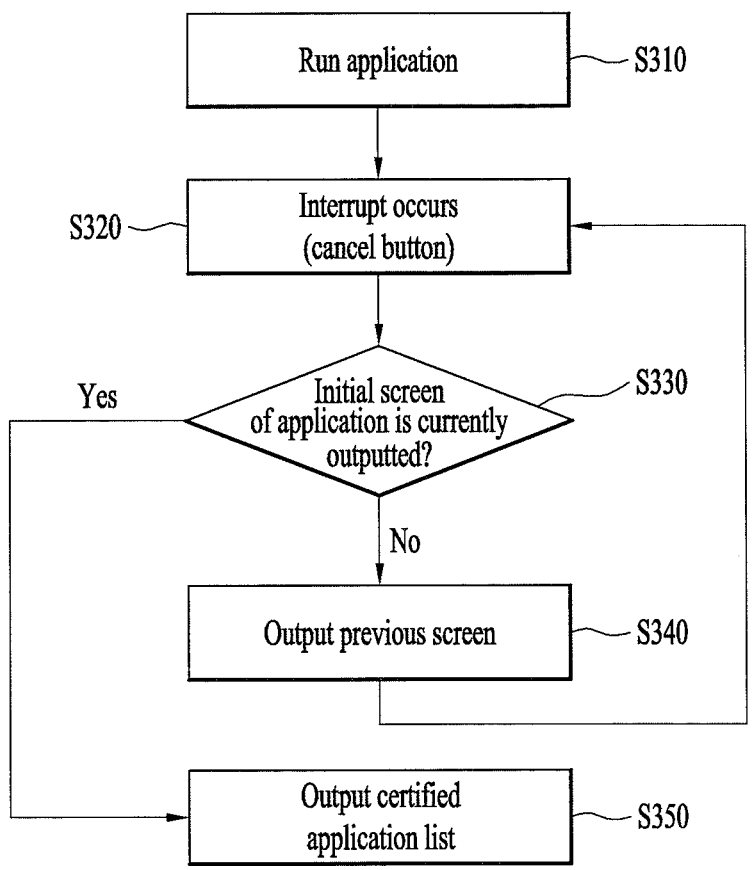
FIG. 3 is a diagram illustrating operations of a mobile terminal and an IVI system when receiving a user input of pressing a cancel button.
Figure 4:
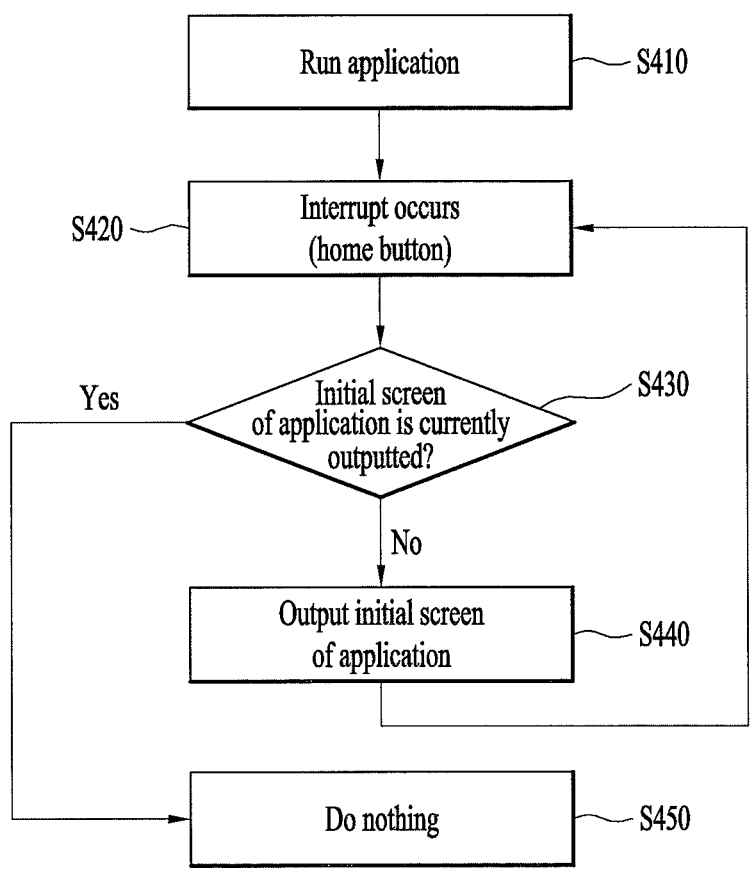
FIG. 4 is a diagram illustrating operations of a mobile terminal and an IVI system when receiving a user input of pressing a home button.

FIG. 3 and FIG. 4 are diagrams illustrating an operation of a mobile terminal and an operation of an IVI system for an occurrence of an interrupt for requesting to stop an output of a screen currently output through the IVI system, respectively. In particular, FIG. 3 is a diagram illustrating operations of a mobile terminal and an IVI system when receiving a user input of pressing a cancel button. Referring to FIG. 3, if an application is launched through a mobile terminal (S310), an application execution screen can be output through an IVI system. Further, a user can use the application through the mobile terminal or the IVI system.

In aspect of configuration, the application run through the mobile terminal may have depths of several steps. For instance, when a music application is executed, a playable music list is output initially. If a prescribed item is selected from the playable music list, a play screen for playing the selected music file is output. Moreover, while the music play screen is output, if a user input of touching a prescribed button is received, a current play list is output.

In this instance, a music list displayed as soon as the music application is launched can be regarded as having a first depth, and a play screen displayed for a music file selected from the music list can be regarded as having a second depth. Further, the current play list displayed in response to the user input of touching the prescribed button included in the play screen can be regarded as having a third depth.

In particular, if an $(N+1)^{th}$ screen is created through a manipulation within an $N^{th}$ screen having an $N^{th}$ depth, the $(N+1)^{th}$ screen has an $(N+1)^{th}$ depth lower than that of the $N^{th}$ screen. When a user input of pressing a cancel button through the mobile terminal or the IVI system is received (S320), if an initial screen (i.e., a screen having a first depth) of the application is not output currently (No in S330), the mobile terminal can control a previous screen (i.e., a screen having a higher depth) to be output (S340).

The following description is made by taking the above-described music application as one example. First of all, while a music play screen having a second depth is displayed, if a user input of pressing the cancel button is received through the mobile terminal or the IVI system, the mobile terminal can display a music list of a first depth, which is higher than the second depth. Hence, through the IVI system, the music list can be output.

When a user input of pressing the cancel button is received through the mobile terminal or the IVI system (S320), if an initial screen (i.e., a screen having a first depth) of the application is currently output (Yes in S330), the mobile terminal can control a certified application list to be output through the IVI system (S350). In particular, the mobile terminal displays a certified application list instead of a home screen through the IVI system, thereby preventing an element of a non-certified application to be output through the IVI system.

Next, FIG. 4 is a diagram illustrating operations of a mobile terminal and an IVI system when receiving a user input of pressing a home button. Referring to FIG. 4, if an application is launched through a mobile terminal (S410), an application execution screen can be output through an IVI system. Further, a user can use the application through the mobile terminal or the IVI system.

When a user input of pressing a home button through the mobile terminal or the IVI system is received (S420), if an initial screen (i.e., a screen having a first depth) of the application is not output currently (No in S430), the mobile terminal can control the initial screen (i.e., the screen having the first depth) to be output (S440). Hence, the initial screen of the application may be displayed through the IVI system.

The following description is made by taking a music application as one example. First of all, while a current play list having a third depth or a music play screen having a second depth is output, if a user input of pressing the home button is received through the mobile terminal or the IVI system, the mobile terminal can control a music list of the first depth to be output. Hence, through the IVI system, the screen of the first depth is displayed.

When a user input of pressing the home button is received through the mobile terminal and the IVI system (S420), if the initial screen (i.e., the screen having the first depth) of the application is currently output (S430), the mobile terminal can control the initial screen (i.e., the screen having the first depth) to be output as it is (S450). Hence, the IVI system maintains the output of the initial screen of the application as well.

In particular, although a user input of pressing a home button is received, the mobile terminal can control an initial screen (i.e., a screen having a first depth) of an application to be output instead of a home screen through the IVI system. As the home screen is prohibited from being output through the IVI system, to the mobile terminal can prevent an element of a non-certified application from being output through the IVI system.

Embodiment 2—Case of Existence of Launcher Application

First of all, a launcher application is the name of an application that provides a function of setting a wallpaper (or a background screen), an icon arrangement and the like to meet the user's taste. If CCC certification is granted to the launcher application, the launcher application can be output through an IVI system using MirrorLink. For clarity of the following description, a screen created by the launcher application shall be named a launcher screen.

The launcher screen can have a plurality of depths. For instance, when the launcher application is executed initially, the launcher screen is output. If a user input of selecting a prescribed button on the launcher screen is received, a setting screen for customizing the launcher screen is output. In this instance, the launcher screen displayed as soon as the launcher screen is run can be regarded as having a first depth. Also, the setting screen for customizing the launcher screen can be regarded as having a second depth.

In order to prevent elements of a non-certified application from being disposed on the launcher screen created through the launcher application having the CCC certification granted thereto, only the elements of the certified application (e.g., an icon or widget of the certified application) can be set to be handled through the launcher application. In particular, the elements of the certified application can be disposed on the launcher screen by excluding the elements of the non-certified application.

Based on the above description, operations of a mobile terminal and an IVI system are described in detail as follows. In particular, FIG. 5 and FIG. 6 are diagrams illustrating an operation of a mobile terminal and an operation of an IVI system when an occurrence of an interrupt for requesting to stop an output of a screen currently output through the IVI system, respectively.

Figure 5:
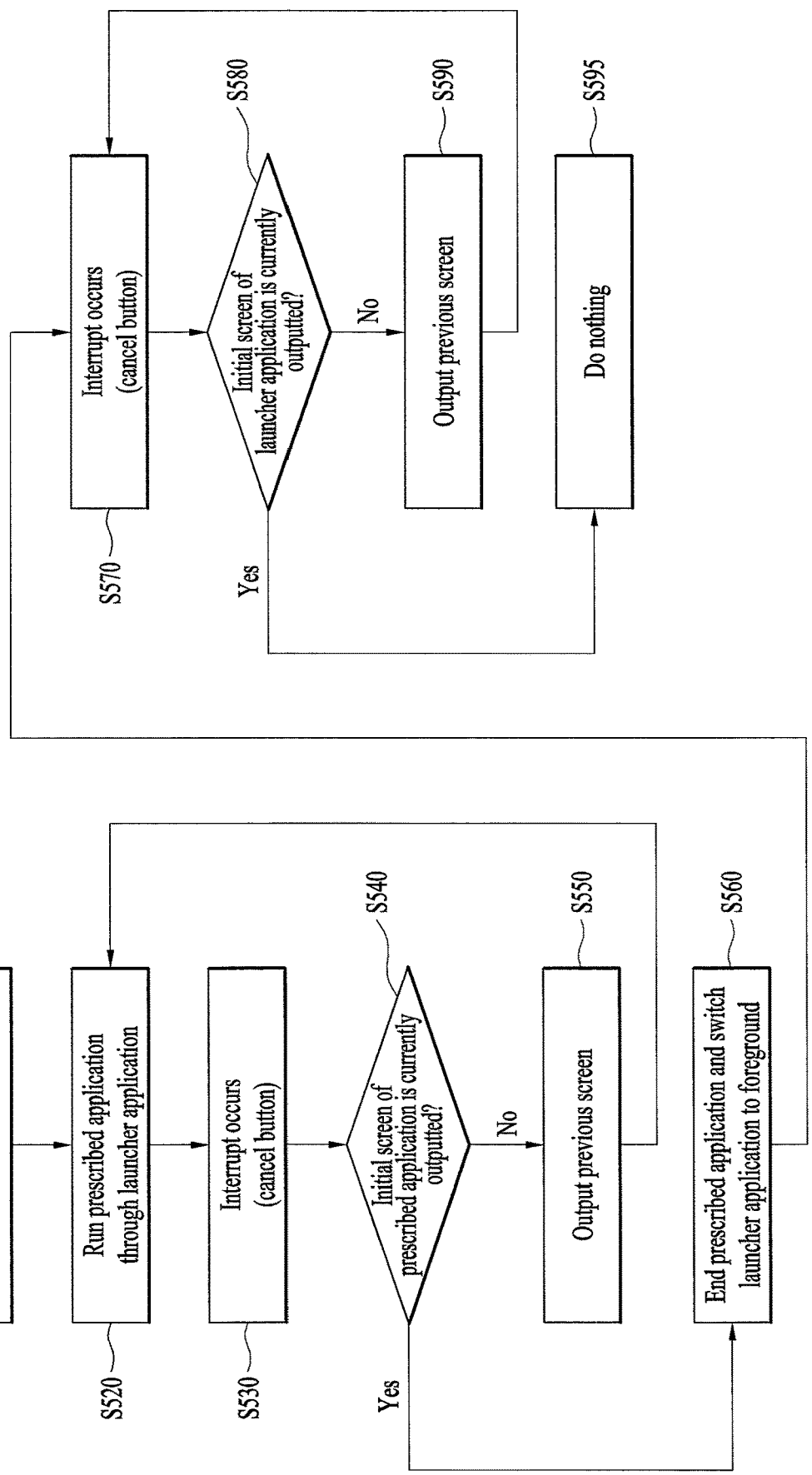
FIG. 5 is a diagram illustrating operations of a mobile terminal and an IVI system when receiving a user input of pressing a cancel button.
Figure 6:
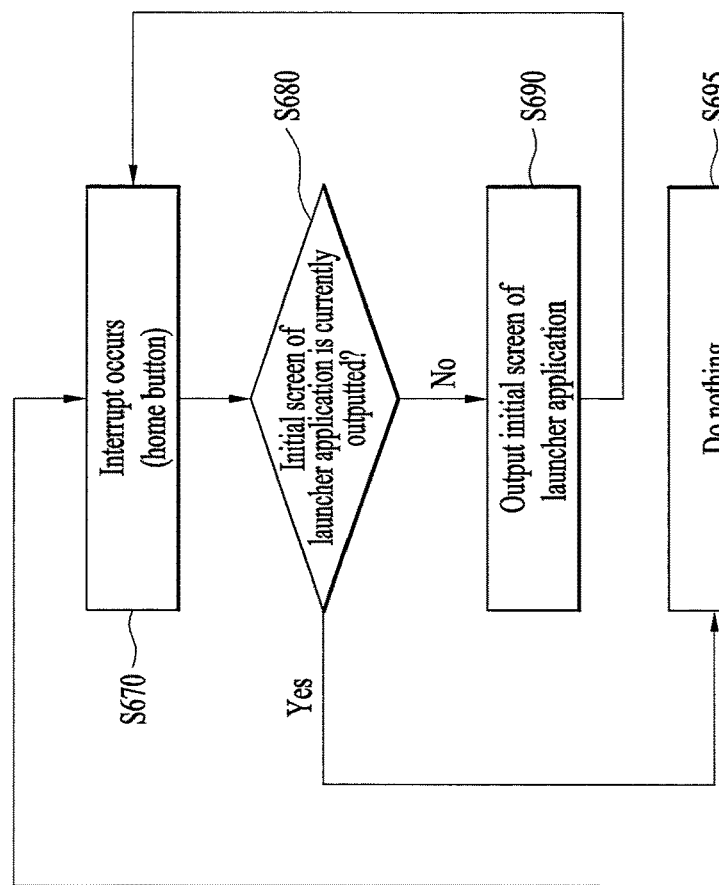
FIG. 6 is a diagram illustrating operations of a mobile terminal and an IVI system when receiving a user input of pressing a home button.
Figure 6:
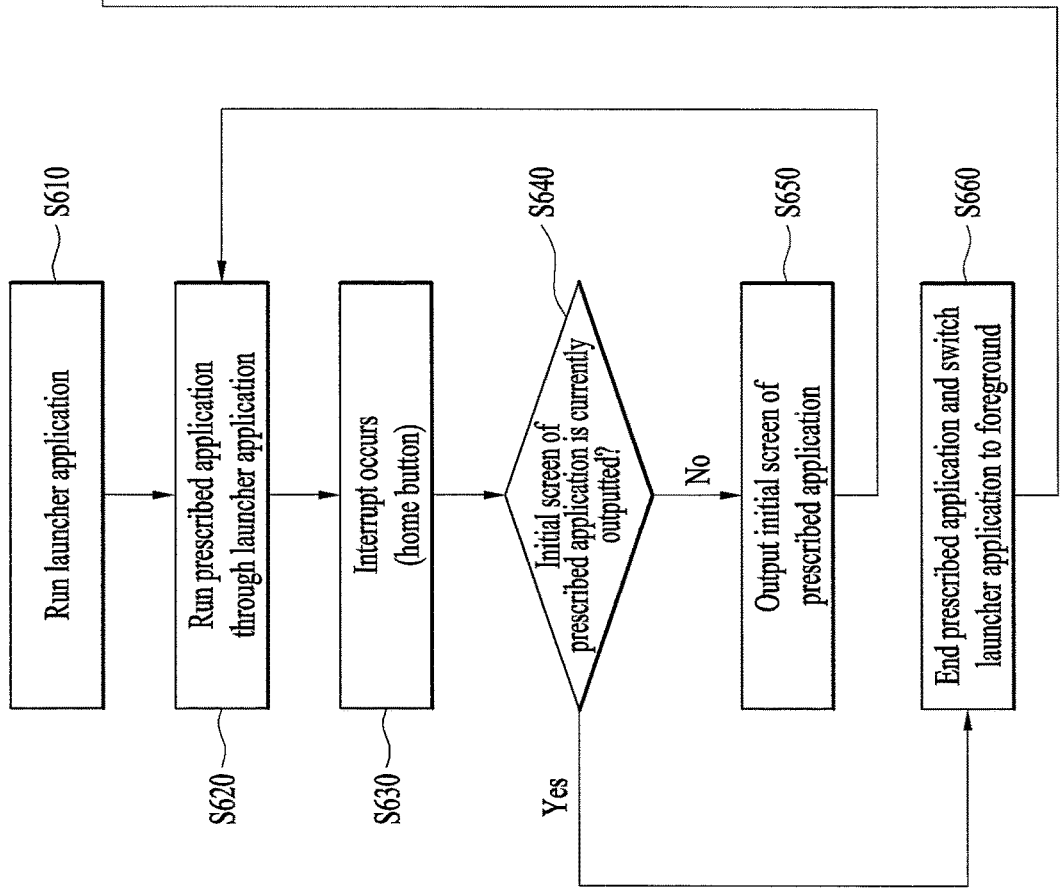

FIG. 5 is a diagram illustrating operations of a mobile terminal and an IVI system when receiving a user input of pressing a cancel button. Referring to FIG. 5, when a launcher application is installed on a mobile terminal, if a connection is established between the mobile terminal and an IVI system, an execution screen of the launcher application can be output through the IVI system instead of a certified application list (S510). In another instance, if a connection is established between the mobile terminal and the IVI system, the certified application list is output through the IVI system in the first place. Further, if the launcher application is selected from the certified application list, the running screen of the launcher application may be then output (S510).

While the execution screen of the launcher application is displayed, if a prescribed user input is received, the mobile terminal can execute a prescribed application corresponding to a selected icon (S520). For instance, if a user input of selecting an icon from a launcher screen is received through the mobile terminal or the IVI system, the mobile terminal can execute a prescribed application corresponding to the selected icon. Once the prescribed application is executed through the mobile terminal, an execution screen of the prescribed application can be displayed through the IVI system.

When a user input of pressing a cancel button through the mobile terminal or the IVI system is received (S530), if an initial screen (i.e., a screen having a first depth) of the prescribed application is not output currently (No in S540), the mobile terminal can control a previous screen (i.e., a screen having a higher depth) to be output (S550). Hence, the previous screen of the prescribed application can be displayed through the IVI system.

When a user input of pressing the cancel button is received through the mobile terminal or the IVI system (S530), if an initial screen (i.e., a screen having a first depth) of the prescribed application is currently output (Yes in S540), the mobile terminal ends the prescribed application (or switches to a background state) and can switch the launcher application to a foreground state (S560). As the launcher application is switched to the foreground state, the execution screen of the launcher application can be displayed through the IVI system.

Further, the execution screen of the launcher application output through the IVI system may include a screen last output before executing the prescribed application. For instance, if the prescribed application is executed through the execution screen of the launcher application having a second depth, the execution screen of the launcher application having the second depth may be output through the IVI system in response to the user input of pressing the cancel button.

When a user input of pressing the cancel button through the mobile terminal or the IVI system is received (S570), if an initial screen (i.e., a screen having a first depth) of the launcher application is not output currently (No in S580), the mobile terminal can control a previous screen (i.e., a screen of a higher depth) of the launcher application to be output (S590).

For instance, while a setting screen of the launcher screen having the second depth is output, if a user input of pressing the cancel button through the mobile terminal or the IVI system is received, the mobile terminal can control the launcher screen of the first depth higher than the second depth to be output. Hence, the launcher screen of the first depth can be displayed through the IVI system as well.

When a user input of pressing the cancel button is received through the mobile terminal or the IVI system (S570), if the initial screen (i.e., the screen having the first depth) of the launcher application is currently output (Yes in S580), the mobile terminal can control the initial screen (i.e., the screen having the first depth) of the launcher screen to be output as it is (S595). Hence, the IVI system maintains the output of the initial screen of the launcher application as well.

In particular, although a user input of pressing a cancel button is received, the mobile terminal can control an initial screen of a launcher application to be output instead of a home screen through the IVI system. By controlling the initial screen of the launcher screen to be output instead of the home screen, it can prevent an element of a non-certified application from being output through the IVI system.

Operations of a mobile terminal and an IVI system are described in detail with reference to FIG. 6 as follows. In particular, FIG. 6 is a diagram illustrating operations of a mobile terminal and an IVI system when receiving a user input of pressing a home button.

Referring to FIG. 6, when a launcher application is installed on a mobile terminal, and if a connection is established between the mobile terminal and an IVI system, an execution screen of the launcher application may be output through the IVI system instead of a certified application list (S610). In another instance, if a connection is established between the mobile terminal and the IVI system, the certified application list is output through the IVI system in the first place. Further, if the launcher application is selected from the certified application list, the execution screen of the launcher application may be then output.

While the execution screen of the launcher application is output, if a prescribed user input is received, the mobile terminal can execute a prescribed application corresponding to a selected icon (S620). For instance, if a user input of selecting an icon from a launcher screen is received through the mobile terminal or the IVI system, the mobile terminal can execute a prescribed application corresponding to the selected icon.

Once the prescribed application is executed through the mobile terminal, an execution screen of the prescribed application can be output through the IVI system. When a user input of pressing a home button through the mobile terminal or the IVI system is received (S630), if an initial screen (i.e., a screen having a first depth) of the prescribed application is not output currently (No in S640), the mobile terminal can control the initial screen (i.e., the screen having the first depth) to be output (S650).

When a user input of pressing the home button is received through the mobile terminal and the IVI system (S630), if an initial screen (i.e., a screen having a first depth) of the prescribed application is currently output (Yes in S640), the mobile terminal ends the prescribed application (or switches to a background state) and can switch the launcher application to a foreground state (S660). As the launcher application is switched to the foreground state, the execution screen of the launcher application can be displayed through the IVI system.

Further, the execution screen of the launcher application output through the IVI system may include a screen last output before running the prescribed application. For instance, if the prescribed application is executed through the execution screen of the launcher application having a second depth, the execution screen of the launcher application having the second depth can be displayed through the IVI system in response to the user input of pressing the home button.

When a user input of pressing the home button through the mobile terminal or the IVI system is received (S670), if an initial screen (i.e., a screen having a first depth) of the launcher application is not output currently (No in S680), the mobile terminal can control the initial screen (i.e., the screen of the first depth) of the launcher application to be output (S690).

When a user input of pressing the home button is received through the mobile terminal and the IVI system (S670), if the initial screen (i.e., the screen having the first depth) of the launcher application is currently output (Yes in S680), the mobile terminal can control the initial screen (i.e., the screen having the first depth) of the launcher screen to be output as it is (S695). Hence, the IVI system can maintain the output of the initial screen of the launcher application as well.

In particular, although a user input of pressing a home button is received, the mobile terminal can control an initial screen of a launcher application to be output instead of a home screen through the IVI system. By controlling the initial screen of the launcher screen to be output instead of the home screen, it can prevent an element of a non-certified application from being output through the IVI system.

Embodiments 1 and 2 mentioned in the above descriptions may be selectively applicable depending on whether a CCC certification granted launcher application is installed on a mobile terminal. Although the CCC certification granted launcher application is installed on the mobile terminal, if it is unable to use the launcher application through the mobile terminal (e.g., if a version of the launcher application is low, if an error is generated from running the launcher application, etc.), Embodiment 1 may be application.

Figure 7:
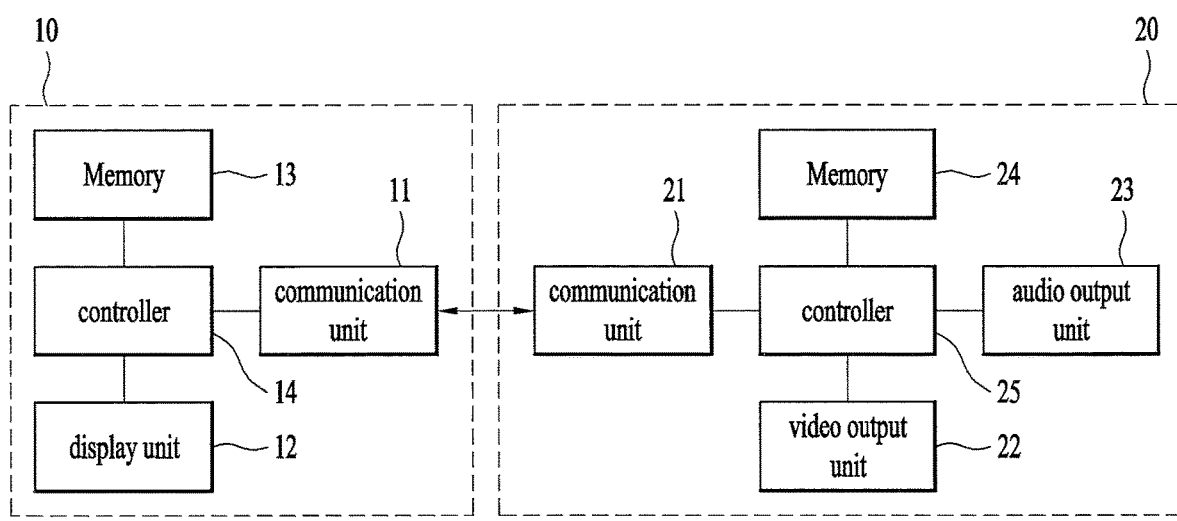
FIG. 7 is a block diagram of a mobile terminal and an IVI system according to an embodiment of the present invention.

Next, FIG. 7 is a block diagram of a mobile terminal and an IVI system according to an embodiment of the present invention. Referring to FIG. 7, a mobile terminal 10 includes a communication unit 11, a display unit 12, a memory 13 and a controller 14. The communication unit 11 is configured to communicate with an IVI system and may include at least one of a wire interface and a wireless communication module to communicate with the IVI system.

Further, the controller 14 sends video (or image) data and audio data to the IVI system through the communication unit 14 and can receive information (e.g., information on touch coordinates, information on an object selected by a touch, etc.) on a user input from the IVI system. In addition, the display unit 12 displays information processed by the mobile terminal 100. For instance, the display unit 12 can display an execution screen of an application launched in the mobile terminal 100 or information of a UI (user interface) or GUI (graphic user interface) according to the execution screen. The display unit 12 can configure a touchscreen by constructing a mutual layer structure with a touch sensor.

Further, the memory 13 stores data supportive of various functions. The memory 13 may also store a multitude of applications launched in the mobile terminal 100, data for operations of the mobile terminal 100, commands and the like. Also, an application is saved in the memory 13 and installed on the mobile terminal 100. Hence, the application can be launched to perform an operation (or function) of the mobile terminal 100 by the controller 14.

The controller 14 generally controls overall operations of the mobile terminal as well as operations related to application programs. Further, the controller 14 processes signals, data, information and the like input or output through the above-described components or launches the application programs saved in the memory 13, thereby processing/providing appropriate information or functions for/to a user. The controller 14 can also transmit image data created from capturing an application execution screen output through the display unit 12 to the IVI system. As the IVI system outputs the image data received from the mobile terminal 100, screen replication can be performed between the mobile terminal 100 and the IVI system in the course of performing MirrorLink.

In addition, the IVI system 20 includes a communication unit 21, a video output unit 22, an audio output unit 23, a memory 24 and a controller 25. The communication unit 21 is configured to communicate with the mobile terminal 10.

The communication unit 21 may include at least one of a wire interface and a wireless communication module to communicate with the mobile terminal. The controller 25 receives video (or image) data and audio data from the mobile terminal through the communication unit 21 and can send information (e.g., information on touch coordinates, information on an object selected by a touch, etc.) on a user input to the mobile terminal 10 through the communication unit 21.

Further, the video output unit 22 outputs video or image information received from the mobile terminal and may include a center fascia display, a head-up display, a rear seat display and the like. In this instance, each of the displays may configure a touchscreen by constructing a mutual layer structure with a touch sensor. If a touch input is received through the touchscreen, the controller 25 can send information on the received touch input to the mobile terminal.

The audio output unit 23 is configured to output audio data received from the mobile terminal and may include a head unit, a car audio system and the like. Further, the memory 24 temporarily stores video and/or audio data received from the mobile terminal and also stores data (e.g., user input information) and the like to send to the mobile terminal. The memory 24 can also store data and commands for operations of the IVI system 20.

In addition, the controller 25 generally controls overall operations of the IVI system 20. The controller 25 can process signals, data, information and the like input or output through the above-described components and/or data saved in the memory 24. The controller 25 may also include at least one of ECU (electronic control unit), MU (microprocessor) and the like.

As mentioned in the foregoing description, the present invention provides a method of preventing non-certified application elements from being output on interworking between an IVI system and a mobile terminal. As the possibility of non-certified application use is eliminated, the driving safety is enhanced.

Accordingly, the present invention provides the following advantages. First of all, according to an embodiment of the present invention, an efficient manipulating mechanism is disclosed in performing an interworking function between a vehicle and a mobile terminal. Particularly, according to an embodiment of the present invention, since outputs of non-certified application elements are excluded in MirrorLink, the driving safety can be secured.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A vehicle head-unit for communicating with a mobile device based on MirrorLink, the vehicle head-unit comprising:
   a video output unit;
   a memory;
   a communication unit configured to establish a connection between the mobile device and the vehicle head-unit; and
   a controller coupled to the video output unit, the memory and the communication unit,
   wherein the controller is configured to:
   control the video output unit to display a certified application,
   receive an interrupt corresponding to a home key event or a back key event,
   switch to a native UI of the vehicle head-unit or move to a launcher application if the interrupt leads to an uncertified content, and
   move to a previous screen of a current application if the interrupt does not lead to the uncertified content,
   wherein a vehicle having the vehicle head-unit includes at least one of a drive mode and a park mode, and
   wherein the controller is further configured to:
   cause the video output unit to display a drive-certified application in the drive mode, and
   cause the video output unit to display both of the drive-certified application and a base-certified application in the park mode.

2. The vehicle-head unit of claim 1, wherein the vehicle head-unit corresponds to a MirrorLink client while the mobile device corresponds to a MirrorLink server.

3. The vehicle-head unit of claim 1, wherein the certified application is launched by using the launcher application.

4. The vehicle-head unit of claim 1, wherein the communication unit is further configured to receive installed MirrorLink application information from the mobile device.

5. A method of communicating with a MirrorLink server in a MirrorLink client based on MirrorLink, the method comprising:
   establishing a connection between the MirrorLink client and the MirrorLink server;
   displaying at least one of a certified application in a video output unit, wherein the at least one of the certified application is launched based on a launcher application;
   receiving an interrupt corresponding to a home key event or a back key event;
   switching to a native UI of the MirrorLink client or moving to the launcher application if the interrupt leads to an uncertified content;
   moving to a previous screen of a current application if the interrupt does not lead to the uncertified content, wherein a vehicle having the MirrorLink client includes at least one of a drive mode and a park mode;
   causing the video output unit to display a drive-certified application in the drive mode; and
   causing the video output unit to display both of the drive-certified application and a base-certified application in the park mode.

6. The method of claim 5, further comprising:
   receiving installed MirrorLink application information from the mobile device.

* * * * *